United States Patent [19]
Storer, Jr.

[11] 3,747,729
[45] July 24, 1973

[54] FRICTION DRIVE ESTABLISHING DEVICE CLEARANCE CONTROL MECHANISM

[75] Inventor: John E. Storer, Jr., Indianapolis, Ind.

[73] Assignee: General Motors Corporation, Detroit, Mich.

[22] Filed: Jan. 21, 1972

[21] Appl. No.: 217,149

[52] U.S. Cl......... 192/70.28, 192/70.13, 192/70.25, 192/85 AA, 188/72.3, 188/196 M, 29/434
[51] Int. Cl... F16d 13/52, F26d 55/40, B23p 19/00
[58] Field of Search.............. 192/70.13, 70.25, 192/70.28, 85 AA, 111 B; 188/71.7, 72.3, 196 M, 216; 29/434

[56] References Cited
UNITED STATES PATENTS

| | | | |
|---|---|---|---|
| 2,869,701 | 1/1959 | Yokel | 192/85 AA |
| 2,890,777 | 6/1959 | Weiland | 192/85 AA |
| 2,255,383 | 9/1941 | Hall | 188/71.7 |
| 2,924,302 | 2/1960 | Black | 188/72.3 |
| 3,653,118 | 4/1972 | Koivunen | 29/434 |

Primary Examiner—Allan D. Herrmann
Attorney—W. E. Finken, D. F. Scherer et al.

[57] ABSTRACT

A method and apparatus for establishing a predetermined clearance disc-type drive establishing friction device. The friction disc and a backing or pressure plate having openings therein assembled in a housing. A threaded member is inserted into the opening and threaded into the housing until all of the clearance between the discs is removed and then unthreaded until the desired clearance between the discs is established. A removable stop member on the threaded member permits the backing or pressure plate to be removed and reinstalled so that a return spring can be assembled circumjacent the threaded member without affecting the preset clearance. The clearance may also be established by using shims to control clearance when the threaded member is threaded into the housing.

3 Claims, 3 Drawing Figures

Patented July 24, 1973 3,747,729

FRICTION DRIVE ESTABLISHING DEVICE CLEARANCE CONTROL MECHANISM

This invention relates to clearance control devices for transmission disc-type friction clutches and brakes and more particularly to devices which can be preset before assembly of the friction discs into the transmission.

To enable control quality in shifting from one disc-type friction device to another disc-type friction device and to achieve lower shift energy, for longer disc life, an important factor is to control the engagement time for each disc-pack. Engagement time is affected by the net displacement variation of the piston for each disc-type device which varies from transmission to transmission. The net displacement is controlled to some extent by maintaining a residual pressure on the piston of the brake or clutch motor. This may be accomplished through the use of a low pressure check valve in the clutch or brake exhaust passage such as in the control described in U.S. Pat. No. 3,459,071 issued to R. H. Schaefer Aug. 5, 1969. Various methods including selective assembly and devices for automatic adjustment are in use in present controls as a solution for this problem. For disc-type devices where disc wear is negligible automatic self-adjustment is not required, and it is attractive from both a cost and servicing standpoint to avoid selective parts for the solution.

The present invention permits the presetting of the desired friction disc clearance prior to or during assembly of the transmission, so that the disc clearance is consistent from transmission to transmission. This presetting of clearances combined with a low pressure exhaust check value establishes more consistent engagement time from transmission to transmission. In accordance with the present invention, the friction disc and the backing plate are assembled into a housing. A threaded member is then threaded into the housing to force the friction disc and backing plate into abutting relationship thereby removing all of the clearance between the disc. The threaded member is then unthreaded from the housing a sufficient distance to provide the desired clearance between the friction disc when the device is disengaged. A removable stop member, such as a snap ring, is placed on the threaded member during assembly and may be removed after the preset clearance has been established to permit the completion of assembly. With the stop member removed from the threaded member, the backing plate may be removed and the disc may be removed to permit installation of return springs and gearing components of the transmission without affecting the previous adjustment. An appropriate tool may be used to perform the snap ring function during the adjusting phase of assembly and with this method the snap ring will be used only once.

It is an object of this invention to provide an improved method and structure for establishing a predetermined free-running clearance in a friction disc-type selectively engageable clutch or brake.

Another object of this invention is to provide in an improved friction disc clearance control mechanism a threaded member having a stop member thereon which may be threaded into a housing to move the friction discs and backing plate of a disc-type device into abutting relationship and then be unthreaded from the housing to the predetermined time-setting. The stop member may then be removed to permit the completion of friction disc assembly, such as the installation of return springs.

Other objects and advantages of the present invention will be more apparent from the following description and drawings in which.

Figure 1:
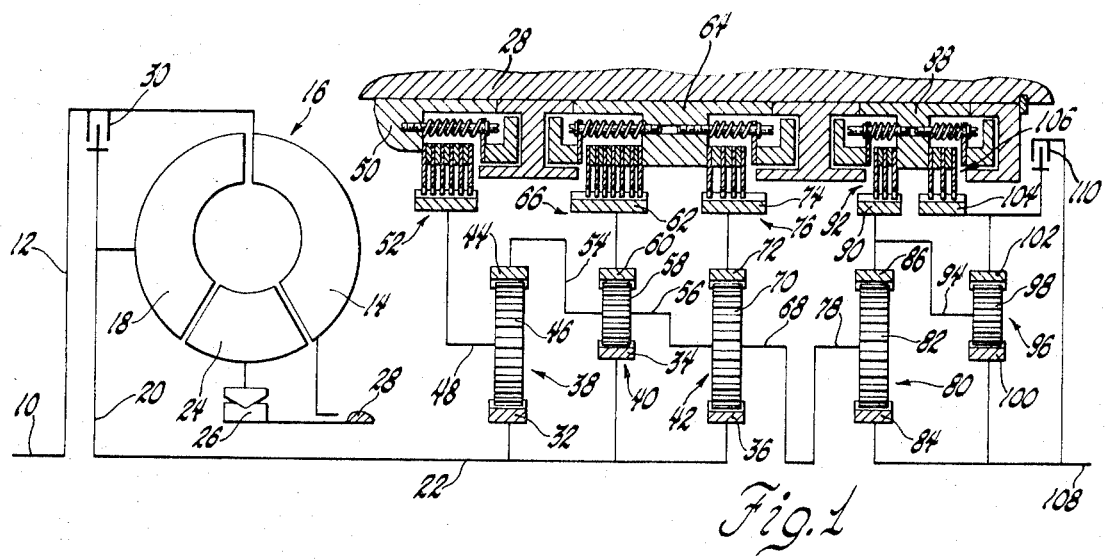
FIG. 1 is the schematic representation of a transmission having preset clearance on the friction discs.

Referring to the drawings, there is shown in FIG. 1 a transmission having an input shaft 10, drivingly connected through a hub 12 to an impeller 14 of a conventional torque converter 16. The torque converter 16 also includes a turbine 18 drivingly connected through a hub 20 to a turbine shaft 22, and a stator 24 operatively connected through a one-way device 26 to the transmission housing 28. A conventional lock-up clutch 30 is operatively connected between the hubs 12 and 20 to permit lock-up of the torque converter 16.

The turbine shaft 22 is drivingly connected to three sun gears 32, 34 and 36 which are components of planetary gear sets 38, 40 and 42, respectively. The planet set 38 also has a ring gear 44 and a plurality of planet pinions 46 meshing with the sun gear 32 and the ring gear 44 and rotatably mounted on a carrier 48 which is selectively connectable to a brake housing 50 through a friction disc-type brake 52. The ring gear 44 is connected via a hub 54 to a carrier 56 which is a component of the planetary gear set 40. A plurality of pinion gears 58 are rotatably mounted on the carrier 56 and mesh with the sun gear 34 and a ring gear 60. The ring gear 60 is drivingly connected to a hub 62 which may be selectively connected to a brake housing 64 through a disc-type friction brake 66. The carrier 56 is drivingly connected to a carrier 68 which is a component of the planetary gear set 42. The planetary gear set 42 also includes a plurality of pinion gears 70 meshing with the sun gear 36 and a ring gear 72 which is selectively connectable with the housing 64 through a hub 74 and a selectively operable friction disc-type brake 76.

The carrier 68 is drivingly connected to a carrier 78 which is a component in a planetary gearing set 80. Rotatably mounted on the carrier 78 are a plurality of pinions 82 which mesh with a sun gear 84 and a ring gear 86.

The ring gear 86 is selectively connectable to a brake housing 88 through a hub 90 and a selectively operable disc brake 92. The ring gear 86 is also drivingly connected to a carrier 94 which is a component of a planetary gear set 96. A plurality of pinions 98 are rotatably mounted on the carrier 94 and mesh with a sun gear 100 and a ring gear 102. The ring gear 102 is selectively connectable with the housing 88 through a hub 104 and a selectively operable disc brake 106. The sun gears 84 and 100 are drivingly connected to a transmission output shaft 108 which is also selectively connectable to the ring gear 102 through a conventional direct drive clutch 110.

The transmission shown in FIG. 1 is operable through the planetary gear sets 38, 40, 42, 80 and 96 and the disc brakes 52, 66, 76, 92 and 106 and the direct clutch 110 to provide six forward speeds and three reverse speeds. The planetary gear sets 80 and 96 are operable to provide a direct drive when the clutch 110 is engaged, a low overdrive ratio when the brake 106 is engaged and a high overdrive ratio when the brake 92 is engaged. Thus the planetary sets 80 and 96 provide three drive ratios. The planetary set 42 is operable when the brake 76 is engaged to provide a low forward reduction drive ratio. The planetary set 40 is operable when the brake 66 is engaged to provide a high forward reduction drive ratio. The planetary set 38 is operable when the brake 52 is engaged to provide a reverse drive ratio. The forward and reverse drive ratios are combined with the three drive ratios provided by the planetary sets 80 and 96 so that six forward speeds and three reverse speeds are provided. A more complete description of the operation of this transmission is given in the U.S. Pat. to Breting et al No. 3,264,902 issued Aug. 9, 1966.

Figure 2:
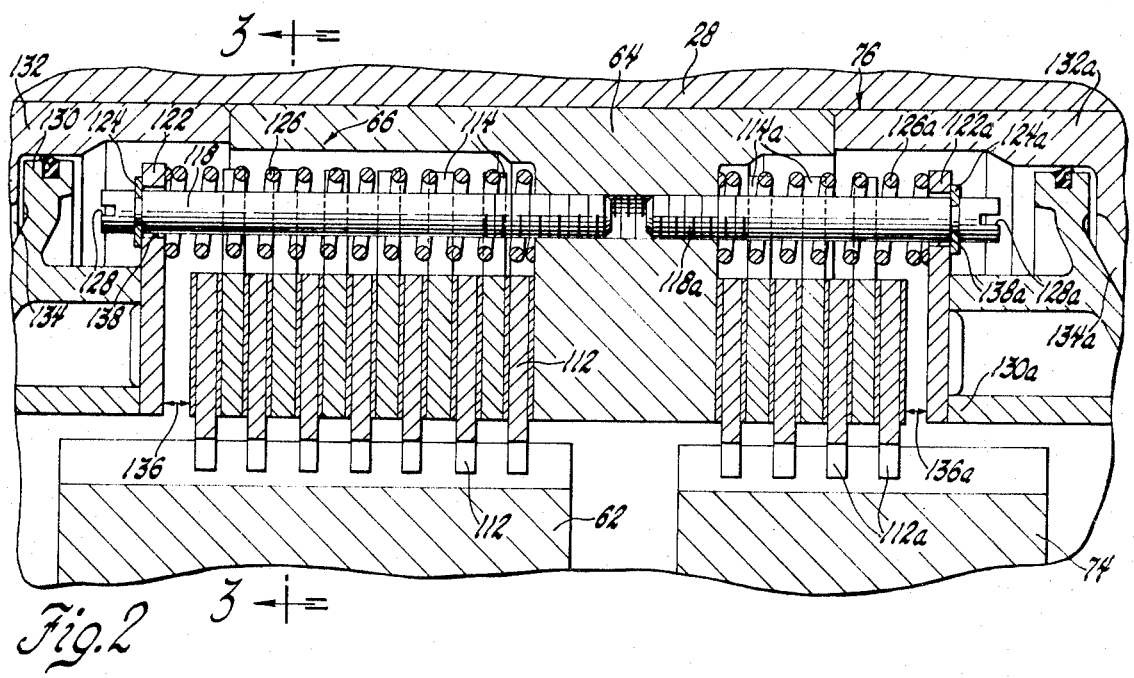
FIG. 2 is an elevational view in section of the friction disc-type device having preset clearance mechanism.
Figure 3:
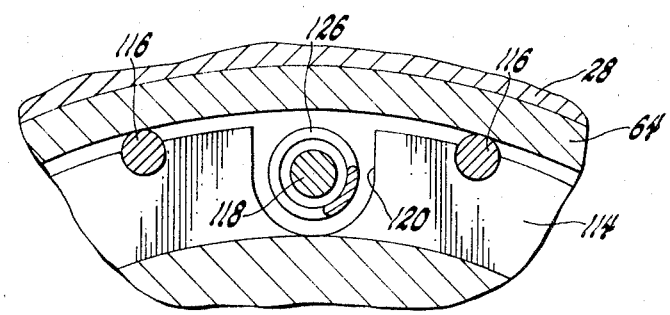
FIG. 3 is the sectional view taken along lines 3—3 of FIG. 2.

Referring to FIGS. 2 and 3, there is shown sectional views of the disc brakes 66 and 76. The disc brakes 52, 92 and 106 are similar in construction to the disc brakes 66 and 76 so that a description of the disc brake 66 and its assembly can be considered as a description of the other disc brakes in the transmissions. The disc brake 66 includes a plurality of alternately spaced friction plates or discs 112 and steel plates or discs 114. The friction plates 112 are splined to the hub 62 and the steel plates 114 are drivingly connected to the housing 64 through a plurality of pins 116 which prevent relative rotation between housing 64 and plates 114. A plurality of threaded members 118 extend through openings 120 in the steel plates 114 and are threaded into the housing 64. A backing plate or pressure plate 122 is also mounted on the threaded members 118 and a stop member such as a snap ring 124 limits the leftward movement of the pressure plate 122. The pressure plate 122 is urged to the left by a plurality of compression springs 126 which also extend through the openings 120 in the steel plates 114. The threaded members 118 have a screwdriver slot 128 at one end thereof which permits the threaded member to be adjusted in the housing 64.

The backing plate 122 is abutted by a fluid-operated piston 130 which is slidably disposed in a piston hub 132 and may be operated on by fluid pressure in a chamber 134. Fluid pressure may be supplied to the chamber 134 by any of the known transmission control devices. Preferably, a control having an exhaust check valve is used. The housing 64 and the piston housing 132 are secured in the transmission housing 28 in abutting relation in any conventional manner such as by splines or threaded fasteners. When it is desired to operate the friction brake 66, the chamber 134 is pressurized thereby moving the piston 130 and the backing plate 122 into engagement with one of the friction discs 112 so that the discs 112 and 114 are moved into abutting relationship to provide a frictional connection between the hub 52 and the housing 64 which housing is connected to the stationary transmission housing 28. When the chamber 134 is pressurized the backing plate and piston move through the distance 136 which is the free-running clearance of the disc pack formed by the discs 112 and 114.

The free-running clearance 136 is preset at assembly of the brake 66 by locating the friction discs 112 and the steel plates 114 in the housing 64. The plates 114 are assembled over the pins 116. The threaded member 118 is inserted through an opening 138 in the backing plate 122 and is then threaded into the housing 64. As the threaded member 118 is threaded into the housing 64 the stop member 124 moves the backing plate into abutting relationship with the friction disc 112 which then compacts the disc 112 and plates 114 until there is zero clearance in the disc pack. The threaded member 118 is then unthreaded from its position in the housing 64 until the desired clearance 136 is established. To complete assembly of the disc brake 66, stop member 124 is removed from the threaded fastener 124 and the backing plate 122 is also removed from the threaded fastener 118 so that the return spring 126 may be installed circumjacent the threaded fastener 118 at which time the backing plate 122 and stop member 124 can be reinstalled. At this time, the hub 62 may then be inserted through the splines of the friction disc 112 and the housing 64 may be placed in the transmission housing 28. Following this assembly the piston housing 132 and piston 130 may be installed in the transmission housing 28, thus completing the installation of disc brake 66 into the transmission.

The friction brake 76 is similar in construction to the friction brake 66 and corresponding parts have been given the same numerical designation with an "a" suffix. The establishment of the clearance 136a and the assembly of the friction brake 76 is accomplished as that described above for brake 66 with the exception that the piston 130a and housing 132a are assembled into the transmission housing 28 prior to the installation of the housing 64. The remaining friction brakes in the transmission are assembled in a manner similar to that described above for friction brake 66.

Obviously, many modifications and variations of the present invention are possible in light of the above teachings. It is, therefore, to be understood that within the scope of the appended claims the invention may be practiced otherwise than as specifically described.

What is claimed is:

1. A method of establishing clearance in a disc-type drive establishing friction device having alternately spaced friction discs adapted to be drivingly connected to a housing and a gear component respectively, said method comprising: locating said friction discs in said housing; locating a backing member in said housing adjacent the outermost one of said friction discs; securing a stop member on a threaded fastener; threading said threaded fastener into said housing through openings in said backing member and said friction discs until said stop member abuts said backing member and said backing member and said friction discs are in abutting relationship; unthreading said fastener from said housing until the desired clearance is established between said backing member and said friction discs; removing said stop member and said backing member from said fastener; placing a return spring on said fastener; and reassembling said backing member and said stop member on said fastener to compress said return spring.

2. A disc-type drive establishing frictin device having a predetermined free-running clearance comprising: a housing having an radial wall; drive connecting means extending axially from said radial wall; first disc members drivingly connected to said drive connecting means; second disc members alternately spaced of said first disc members; pressure plate means adjacent one of said disc members spaced furthest from said radial wall and being drivingly connected to said drive connecting means; aperture means in said pressure plate;

fluid operated piston means slidably disposed in said housing adjacent said pressure plate means for selectively moving said pressure plate means toward said radial wall into abutting relationship with said one of said disc members; threaded fastener means threadably engaged in said radial wall and extending axially therefrom through said aperture means and having a grooved portion spaced from said radial wall; stop means secured to said threaded fastener means in said grooved portion a predetermined distance from said radial wall adjacent said pressure plate means for limiting the movement of said pressure plate means in one direction away from said radial wall for establishing a predetermined clearance between said disc members and said pressure plate means; and spring means compressed between said radial wall and said pressure plate means circumjacent said threaded fastener for urging said pressure plate means in said one direction into abutting relation with said stop means.

3. A method of establishing clearance in a disc-type drive establishing friction device having alternately spaced friction discs adapted to be drivingly connected to a housing and a gear component respectively, said method comprising: locating said friction discs in said housing; locating a backing member in said housing adjacent the outermost one of said friction discs; securing a stop member on a threaded fastener; threading said threaded fastener into said housing through openings in said backing member and said friction discs until the desired clearance is established between said backing member and said friction discs; removing said stop member and said backing member from said fastener; placing a return spring on said fastener; and reassembling said backing member and said stop member on said fastener to compress said return spring.

* * * * *